United States Patent [19]

Hashimoto et al.

[11] Patent Number: 4,940,356

[45] Date of Patent: Jul. 10, 1990

[54] CONSTRUCTION FOR JOINING CHAINSTAY AND SEAT PIPES TO A REAR DROPOUT IN A BICYCLE FRAME

[75] Inventors: Masaki Hashimoto, Osaka; Noboru Yamaguchi, Settsu, both of Japan

[73] Assignee: Araya Industrial Co., Ltd., Osaka, Japan

[21] Appl. No.: 215,558

[22] Filed: Jul. 6, 1988

[30] Foreign Application Priority Data

Nov. 11, 1987 [JP] Japan ............................ 62-171429[U]

[51] Int. Cl.$^5$ ............................................ B62K 19/00
[52] U.S. Cl. .................................... 403/266; 403/277; 403/290; 403/297; 403/310; 403/334; 280/281.1
[58] Field of Search ................ 403/265, 266, 268, 277, 403/289, 297, 290, 334, 310; 29/522.1, 523; 280/274, 279, 281 R; 156/294

[56] References Cited

U.S. PATENT DOCUMENTS

| 582,948 | 5/1897 | Pinover | 403/277 |
| 932,546 | 8/1909 | Hedstrom | 280/281.1 |
| 2,080,698 | 5/1937 | Clark | 280/281.1 |
| 2,874,937 | 11/1955 | Higgins | 403/277 X |
| 4,047,731 | 9/1977 | VanAuken | 280/281.1 |
| 4,479,662 | 10/1984 | DeFour et al. | 280/281.1 |
| 4,598,922 | 7/1986 | Kleinebenne et al. | 280/281.1 X |
| 4,705,286 | 11/1987 | Lauzier et al. | 403/334 X |

FOREIGN PATENT DOCUMENTS 2523541  3/1982  France ............................ 280/281.1

Primary Examiner—Randolph A. Reese
Assistant Examiner—Franco S. Deliguori
Attorney, Agent, or Firm—Stevens, Davis, Miller & Mosher

[57] ABSTRACT

The present invention constitutes a construction joint of a bicycle frame comprising a rear dropout body having projecting portions decreasing in taper as they extend away from the body, each projecting portion defining an elongated screw hole extending along a longitudinal axis of the projecting portion, the projecting portion defining a slit extending on both sides of the screw hole; chainstay and seat stay pipes, each surrounding a projecting portion, the chainstay and seat stay pipes having gradually decreasing diameters towards the base end of the projecting portions; a screw or wedge inserted into the screw hole to enlarge the outside circumference of the projecting portion until it fixedly contacts the interior of the chainstay and seat stay pipes; and an adhesive agent spread around the projecting portion of the rear dropout body and inside the chainstay and seat stay pipes.

3 Claims, 3 Drawing Sheets

CONSTRUCTION FOR JOINING CHAINSTAY AND SEAT PIPES TO A REAR DROPOUT IN A BICYCLE FRAME

The present invention relates to a construction joining chainstay and seat stay pipes to a rear dropout body in a bicycle frame.

BACKGROUND OF THE INVENTION

Up to the present, chainstay and seat stay pipes of bicycle frames are joined to a rear dropout body by adhesive agents.

However, utilizing only adhesive, the worker could not uniformly spread an adhesive agent on a joining part, so that the strength of the joint was insufficient.

To solve the above problem, the idea of Japanese patent application publication No. Sho 50-12935 was suggested.

The construction of the above-mentioned idea is fitted to uniformly shaped pipes joined to each other, but is not utilized to join chainstay and seat stay pipes to a rear dropout, because the pipes are taper-shaped.

SUMMARY OF THE INVENTION

The present invention is related to a construction joining chainstay and seat stay pipes to a rear dropout in a bicycle frame, and the object of the invention is to provide an increase in strength of the joined parts by using a construction whereby the worker can uniformly spread the adhesive agent on the joined parts.

The construction of the present invention comprises the following elements.

a. a projecting portion of a rear dropout body to be surrounded by chainstay and seat stay pipes, the inner diameters of said chainstay and seat stay pipes gradually decreasing towards the base end of the projecting portion;

b. the joined projecting portion defining an elongated screw hole extending along the longitudinal axis of the joined projecting portion, the inner diameter of the screw hole gradually decreasing towards the rear dropout 7;

c. the joined projecting portion defining slits extending on both sides of the screw hole, and equally dividing the section of the joined projecting portion;

d. a screw or wedge inserted into the screw hole; and e. an adhesive agent spread around the joined projecting portion of the rear dropout body.

The circumference of the joined projecting portion is spread out by inserting a screw or wedge into the screw hole. As a result thereof, the joined projecting portion is forced into contact and adheres to the inner circumference of the chainstay and seat stay pipes. At this instance, a frictional connection exists between the projecting portion and the chainstay and seat stay pipes, the diameter of the projecting portion at the screw hole end being greater than the diameter of the projecting portion at the base end.

The worker inserts the screw or wedge into the screw hole, then the outer circumference of the joined projecting portion spreads out towards the inner circumference of the chainstay and seat stay pipes.

The present invention has the following advantages.

A. The adhesive agent is uniformly spread on the inner circumference of the chainstay and seat stay pipes, and gives an increased adhesive strength.

B. An excess amount of the adhesive agent flows into the slits of the joining projecting portion, and so does not flow outside of the joining part. Consequently, the worker does not need to remove excess adhesive agent.

C. Should the adhesive agent lose its adhesiveness, the chainstay and seat stay pipes do not separate from the joined projecting portion, because the inner circumference of the tapered chainstay and seat stay pipes are friction fit to the joining projecting portion as a result of being spread out by insertion of a screw or wedge into the screw hole.

BRIEF DESCRIPTION OF THE DRAWINGS

Other details and features of the invention will stand out from the description given below by way of non-limitative example and with reference to the accompanying drawings, in which.

DESCRIPTION OF THE PREFERRED EMBODIMENT

Figure 1:
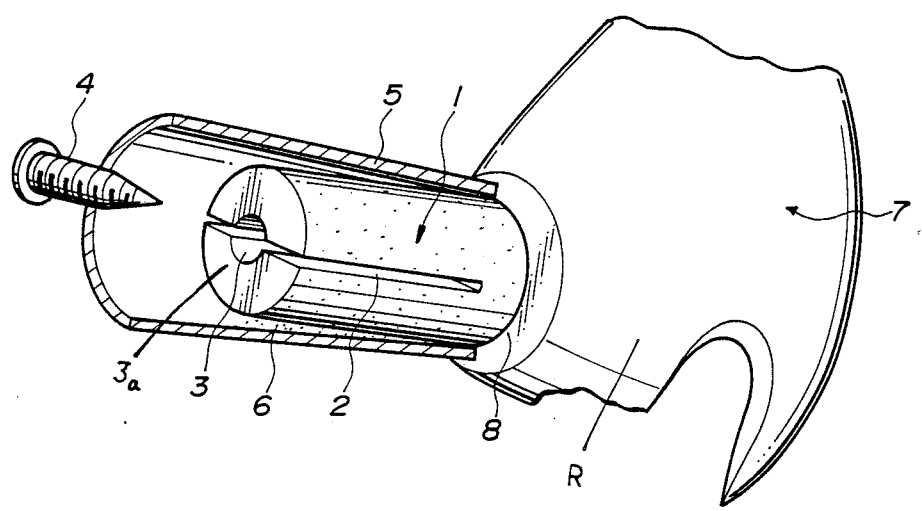
FIG. 1 shows a sketch partly cut open of a construction of the present invention.
Figure 2:
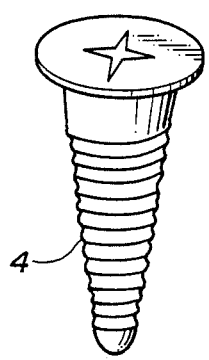
FIG. 2 shows a sketch of a screw.
Figure 3:
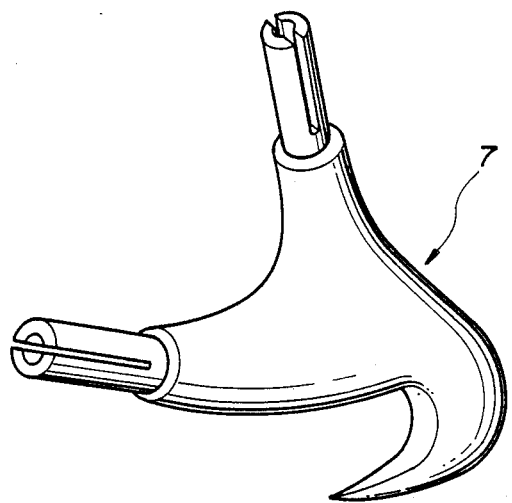
FIG. 3 shows a sketch of a rear dropout.

In FIGS. 1 to 3 the projecting portion 1 projects from a rear dropout body 7. The diameter of the projecting portion 1 gradually increases from its free end face 3a towards the rear dropout body R.

A chainstay pipe 5 is fitted around the projecting portion 1 of a rear dropout body R.

The inner diameter of a chainstay pipe 5 gradually decreases towards the base end 8 of a projecting portion 1 fixed to the rear dropout R. At the base end 8 of the projecting portion 1, the inner diameter of the chainstay pipe 5 and the outer diameter of the base end 8 of the projecting portion 1 finally become equal.

An elongated screw hole 3 is formed in a longitudinal axis of the joining projecting portion 1. Slits 2, 2 extend along both sides of the screw hole 3 and divide into sections the projecting portion but stop short of the base of the projecting portion 1.

The inner diameter of the screw hole 3 gradually decreases from a free end face 3a towards the rear dropout body R.

An adhesive agent 6 is spread between the projecting portion 1 and the chainstay pipe 5.

Hereinafter, follows the actual assembly of the first embodiment.

The screw hole 3 extends along a longitudinal axis of the projecting portion 1 and on both sides of the screw hole 3, slits 2, 2, equally divide the section of the projecting portion 1 and extend down both sides of the screw hole 3. However, the screw hole 3 and slits 2, 2 stop before reaching the base end 8 of the projecting portion 1.

On the other hand, the inner diameter of the chainstay pipe 5 gradually decreases toward its end point.

Hereinafter, is discussed the joining of the chainstay pipe 5 to the rear dropout body R.

First, the worker spreads the adhesive agent 6 around the projecting portion 1, and then, puts the chainstay pipe 5 around the projecting portion 1. Next, the worker inserts the screw 4 into the chainstay pipe 5 from its free end, and screws the screw 4 into the screw hole. The outer circumference of the projecting portion 1 gradually spreads out to the inner circumference of the chainstay pipe 5. The chainstay pipe 5 sticks perfectly and adheres to the projecting portion 1 when the worker finishes screwing the screw 4 into the screw hole 3.

At this time, an excess amount of the adhesive agent 6 spread between the joining projecting portion 1 and the chainstay pipe 5 flows into the slits 2, 2.

Figure 4:
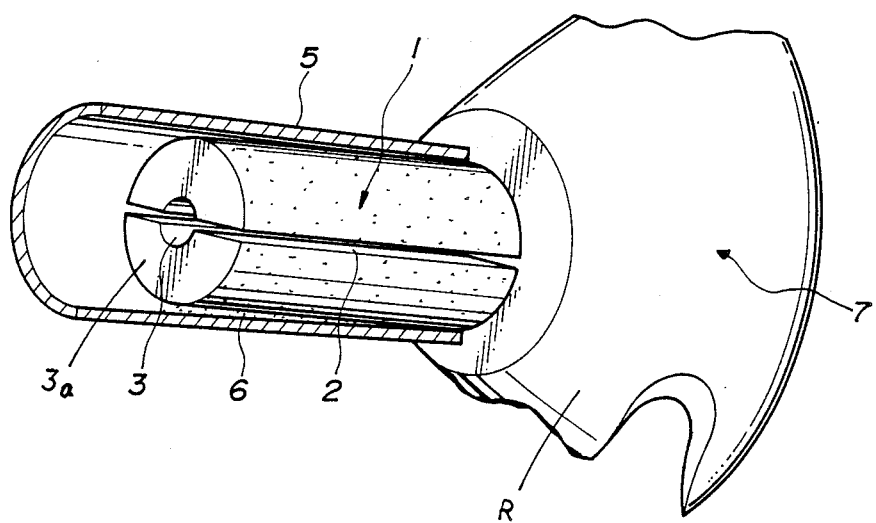
FIG. 4 shows a sketch partly cut open of a second embodiment of the present invention.
Figure 5:
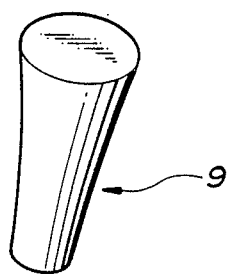
FIG. 5 shows a sketch of a wedge used instead of the screw of the first embodiment.
Figure 6:
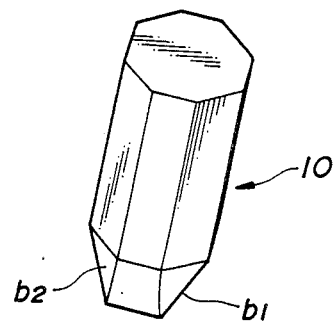
FIG. 6 shows a sketch of a bar provided cutting faces in the point.

FIG. 4 shows the second embodiment of the present invention. The joining projecting portion 1 of FIG. 4 is cylindrical in shape and has a uniform diameter over its whole length. In the embodiment of FIG. 4, the screw hole 3 and slits 2, 2 extend to the base end 8 of the projecting portion 1. The actual operation of joining is the same as in the first embodiment of the present invention. FIG. 5 shows a wedge 9 used instead of the above screw 4 of the first and second embodiments. FIG. 6 shows a bar 10 used instead of the screw 4 of the first and second embodiments.

Figure 7:
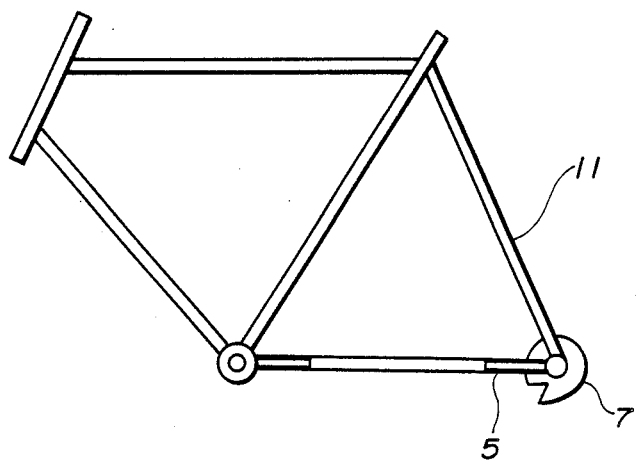
FIG. 7 shows a side view of a joining part of chainstay, seat stay pipes and a rear dropout.

The bar 10 is provided with cutting face $b_1$, $b_2$ in its pointed end. The above-mentioned construction shown in FIGS. 1 to 6 can be used to join a seat stay pipe 11 to a rear dropout 7 as shown in FIG. 7.

Thus, the chainstay, seat stay pipes 5, 11 and the rear dropout 7 are constructed as a single body assembly, and then, said assembly is fixed to the bicycle frame.

We claim:

1. A construction joint of a bicycle frame comprising a rear dropout body having projecting portions cylindrical in shape, each said projecting portion defining an elongated screw hole at a free end extending along a longitudinal axis of said projecting portion, said projecting portion defining a slit extending on both sides of said screw hole; chainstay and seat stay pipes each having ends surrounding a projecting portion, said chainstay and seat stay pipes having gradually decreasing diameters towards their ends surrounding the projecting portions; a screw or wedge inserted into said screw hole to enlarge the outside circumference of said projecting portion until it frictionally contacts the interior of said chainstay and seat stay pipes, whereby the diameter of the projecting portion at said free end is greater than the diameter of the projecting portion at an end opposite said free end; and an adhesive agent spread around the projecting portions of the rear dropout body and inside said chainstay and seat stay pipes.

2. A construction joint of a bicycle frame comprising a rear dropout body having projecting portions decreasing in taper as they extend away from said body at a first end, each said projecting portion defining an elongated screw hole at a second end extending along a longitudinal axis of said projecting portion, said projecting portion defining a slit extending on both sides of said screw hole; chainstay and seat stay pipes each having ends surrounding a projecting portion, said chainstay and seat stay pipes having gradually decreasing diameters towards their ends surrounding the projecting portions; a screw or wedge inserted into said screw hole to enlarge the outside circumference of said projecting portion until it frictionally contacts the interior of said chainstay and seat stay pipes whereby the diameter of the projecting portion at said second end is greater than the diameter of the projecting portion at said first end; and an adhesive agent spread around the projecting portions of the rear dropout body and inside said chainstay and seat stay pipes.

3. The joint of claim 2 wherein the inner diameter of said screw holes gradually decreases from a free end face of the projecting portion toward the rear dropout body.

* * * * *